United States Patent
Onogi (10) Patent No.: US 7,604,172 B2
(45) Date of Patent: Oct. 20, 2009

(54) IMAGE SIGNAL OUTPUT DEVICE AND A METHOD OF GENERATING A CODED IMAGE SIGNAL

(75) Inventor: Nobuyoshi Onogi, Nagoya (JP)

(73) Assignee: Denso Corporation, Kariya (JP)

(*) Notice: Subject to any disclaimer, the term of this patent is extended or adjusted under 35 U.S.C. 154(b) by 658 days.

(21) Appl. No.: 11/257,025

(22) Filed: Oct. 25, 2005

(65) Prior Publication Data

US 2006/0086796 A1   Apr. 27, 2006

(30) Foreign Application Priority Data

Oct. 27, 2004   (JP) .............................. 2004-312409

(51) Int. Cl.
   *G06K 7/10*   (2006.01)
   *G06K 7/00*   (2006.01)
(52) U.S. Cl. .................. 235/454; 235/439; 235/462.01
(58) Field of Classification Search ................ 235/439, 235/454, 462.01; 705/14; 382/275; 455/414.1
   See application file for complete search history.

(56) References Cited

U.S. PATENT DOCUMENTS

| 7,319,862 B1* | 1/2008 | Lincoln et al. ............ 455/414.1 |
| 2004/0117254 A1* | 6/2004 | Nemirofsky et al. .......... 705/14 |
| 2004/0117255 A1* | 6/2004 | Nemirofsky et al. .......... 705/14 |
| 2006/0013502 A1* | 1/2006 | Weigand .................... 382/275 |

FOREIGN PATENT DOCUMENTS

| JP | A-11-041571 | 2/1999 |
| JP | A-11-296661 | 10/1999 |
| JP | A-2000-4407 | 1/2000 |
| JP | A-2001-82971 | 3/2001 |
| JP | A-2002-112210 | 4/2002 |
| JP | A-2004-78351 | 3/2004 |
| JP | A-2004-102782 | 4/2004 |
| JP | A-2004-126942 | 4/2004 |
| JP | A-2004-228720 | 8/2004 |
| JP | A-2004-328496 | 11/2004 |
| JP | A-2005-38181 | 2/2005 |
| WO | WO 2004/008276 | 1/2004 |
| WO | WO 2004008275 A2 * | 1/2004 |
| WO | WO 2004008281 A2 * | 1/2004 |

OTHER PUBLICATIONS

Office Action dated Apr. 21, 2008 in corresponding Japanese Patent Application No. 2004-312409 (and English translation).

* cited by examiner

*Primary Examiner*—Thien M. Le
*Assistant Examiner*—April A Taylor
(74) *Attorney, Agent, or Firm*—Posz Law Group, PLC

(57) ABSTRACT

An image signal output device includes a code generating means for generating a two-dimensional geometrical code based on a source data, a obtaining means for retrieving a sequential image signal, a code inserting means for inserting the two-dimensional geometrical code in the sequential image signal and a output means for outputting the sequential image signal. The code inserting means imperceptibly inserts the two-dimensional geometrical code in the sequential image signal, and the output means outputs the sequential image signal having the two-dimensional geometrical code inserted therein. The imperceptible two-dimensional geometrical code is captured by a camera in a cell phone to be decoded and stored in a memory medium.

20 Claims, 8 Drawing Sheets

IMAGE SIGNAL OUTPUT DEVICE AND A METHOD OF GENERATING A CODED IMAGE SIGNAL

CROSS REFERENCE TO RELATED APPLICATION

This application is based on and claims the benefit of priority of Japanese Patent Application No. 2004-312409 filed on Oct. 27, 2004, the disclosure of which is incorporated herein by reference.

FIELD OF THE INVENTION

The present invention generally relates to a device for inputting and outputting an image signal with matrix codes embedded therein, a program for operating the device, and a method for generating the image signal with the matrix code. The present invention also relates to a matrix code decoding device and a decoding program used therein.

BACKGROUND OF THE INVENTION

In recent years, a matrix code, i.e., a two dimensional bar code, such as QR code (Registered trademark) or similar type of coding method that uses geometrical patterns, is used to convey information as a printed pattern of black and white image on a poster, a brochure or the like. That is, a recipient of the information captures the printed pattern by a camera on a cell phone, and decodes the printed pattern for displaying the information on a display of the cell phone. Japanese Patent Document JP-A-2004-126942, for example, discloses a cell phone that is equipped with a QR code decoding function.

The QR code can also be displayed on a display of a television system, a monitor of a personal computer, a screen of a car navigation system or the like that are capable of displaying a picture being composed of a plurality of images in a time series. Therefore, by using the cell phone, the information in the QR code can be captured, decoded and displayed on a display or the like.

However, the QR code displayed as a part of an image consumes a space for displaying other information and/or images on the display.

SUMMARY OF THE INVENTION

In view of the above-described and other problems, the present invention provides a method and a system (i.e., an image signal output device) for displaying a matrix code on an image display device in a manner that does not disturb an image presented thereon.

The present invention also provides a method and system for capturing and decoding the matrix code displayed on the image display device.

According to one aspect of the present invention, the image signal output device generates the matrix code by using source data, inserts the matrix code as an imperceptible image in a series of images, and outputs the matrix code inserted images as an image signal to an image display device.

In this manner, the image signal having the matrix code inserted therein is output from the image signal output device to the image display device or the like through wired and/or wireless connection. The representation of the image signal having the matrix code on the image display device is not disturbed by the imposition of the matrix code because the matrix code in the image signal is imperceptible.

The matrix code is defined as a geometrical pattern of figures such as small squares or the like to be interpreted as a string of characters and/or numbers based on a fixed rule of interpretation.

The image of the matrix code is imperceptibly inserted in a series of primary images in the following manner. That is, the matrix code image is displayed for a short duration that is defined as a unit of image display time of the image display device. Therefore, the matrix code image may be displayed at an interval that is defined as plural units of the image display time.

The matrix code image is imperceptible when the short duration of time is short enough in comparison with the duration for displaying the primary images.

The insertion of the matrix code image is executed in various manners. For example, the slot for insertion may be determined by using an insertion timing determination device for finding proper timing and occasion. The matrix code image may be inserted plural times in a series of primary images, and each of the inserted matrix code images may be the same or may be respectively different.

The size of the matrix code image may be smaller than the size of the image display device, or may be same as the size of the image display device.

The insertion of the matrix code image may be marked by other image that is distinguishable by a receiver of the image.

The matrix code may be generated from source data that is being encrypted prior to the generation of the matrix code. In this manner, the distribution of the content of the matrix code is restricted. That is, only the recipient who has a decryption key can decode/decrypt the matrix code to have an access to the content.

The matrix code generated from an encrypted source data may include the decryption key. In this manner, the recipient of the matrix code can easily decrypt the encrypted source data in the matrix code.

The matrix code may be generated from source data that includes a restriction on the recipient of the source data. The restriction on the recipient may be imposed based on time, an area, a type of a vehicle, and an ID of a vehicle. In this manner, the recipient of the source data is selectively defined. Further, the source data of the matrix code may include diagnosis data for not disturbingly conveying diagnosis information.

The source data may have relevance to the primary images where the matrix code image is inserted. That is, the primary images may be, for example, the images of a tourist destination, and the corresponding source data may include information on the access and lodgings of the tourist destination.

The matrix code may be a two-dimensional code, and the matrix code may be generated by using text broadcasting data.

According to another aspect of the present invention, a matrix code decoding system includes a camera for capturing the matrix code displayed on the image display device, and a memory for storing the content of the decoded matrix code. That is, the matrix code in the primary image conveys information, and the matrix code captured by the camera is decoded for retrieving the information that is stored in the memory of the decoding system.

The matrix code decoding system may determine a start data and an end data for defining a block of data. That is, the decoding system continuously captures the matrix codes in the images, and the start data and the end data are collected based on the difference of the captured images. In this manner, the matrix code decoding system treats data between the start data and the end data as an integrated body of data, thereby enabling the conveyance of a greater amount of data that cannot be conveyed by using a single image of the matrix code.

The camera in the decoding system may be synchronized with the display of the matrix code for effectively capturing the matrix code.

The matrix code may be used to convey plain (not encrypted) data or encrypted data, and the captured matrix code may be stored in a decrypted form. Further, the matrix code may include decryption key for the ease of decrypting procedure. Furthermore, the matrix code may include restriction conditions of decryption. In this manner, the matrix code can be used for selectively conveying information to a designated recipient. The restriction of the recipient may be based on time, an area, a type of a vehicle and/or an ID of the vehicle.

Data in the matrix code decoded in the decoding system may be stored in the memory, transferred to other system, or displayed on an image display device.

The matrix code may be represented as a two-dimensional code.

According to yet another aspect of the present invention, the matrix code captured by the camera is decoded and stored in the memory for conveying data. In this manner, the image signal output device is used to convey the data by using the matrix code. In this case, the matrix code is extracted from the captured image, and the identified matrix code is decode for data extraction.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

An embodiment of the present invention is described with reference to the drawings.

Figure 1:
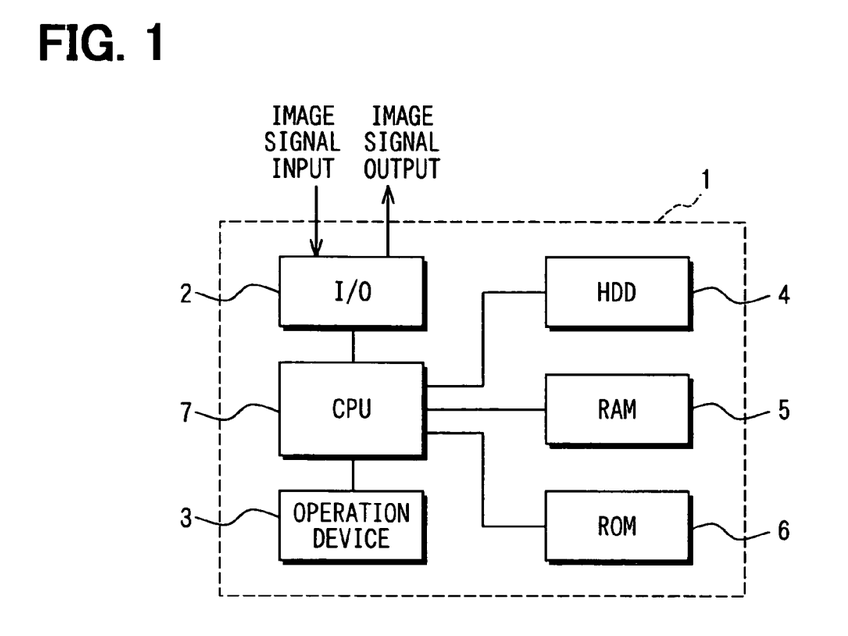
FIG. 1 shows a block diagram of an image signal output device in an embodiment of the present invention.

FIG. 1 shows a block diagram of an image signal output device 1 in an embodiment of the present invention. The image signal output device 1 includes an input/output (I/O) interface 2, an operation device 3, a hard disk drive (HDD) 4, a random access memory (RAM) 5, a read only memory (ROM) 6, and a central processing unit (CPU) 7. The image signal output device 1 generates a QR code (Registered trademark) from source data such as text data or the like, and outputs a primary image generated from an image signal with an imperceptible QR code inserted therein to a recipient.

The I/O interface 2 receives input of image signal from external devices such as a camera or the like, and outputs the image signal as digital data to CPU 7. The I/O interface 2 also receives input of image signal as digital data from the CPU 7, and outputs the image signal as digital or analog data to the external devices. In this case, the image signal includes the image signal for TV broadcasting, the image signal for personal computers, the image signal for navigation systems or the like. That is, the image signal represents a collective unit of images arranged in a time series. More practically, the image signal displays the image by refreshing the display device at a predetermined interval, e.g., by a predetermined refresh rate such as 50 Hz (50 times per second). Each of the images displayed at the predetermined interval differs when the image signal represents moving pictures such as movies or the like. Each of the images refreshed at the predetermined interval is defined and counted as a frame.

The operation device 3 handles user operation and outputs corresponding signal to the CPU 7.

The CPU 7 interacts with the devices in the following manner. That is, the CPU 7 retrieves programs from a non-volatile large scale memory such as the HDD 4, or from a non-volatile memory such as the ROM 6, writes data to a volatile memory such as the RAM 5 or to the HDD 4, read data from the HDD 4, the RAM 5 and the ROM 6, receives signals from the operation device 3, and sends/receives the image signal to/from the I/O interface 2 on demand while the CPU 7 executes the program.

The image signal output device 1 may be made, for example, by using a personal computer having an image input/output function.

Figure 2:
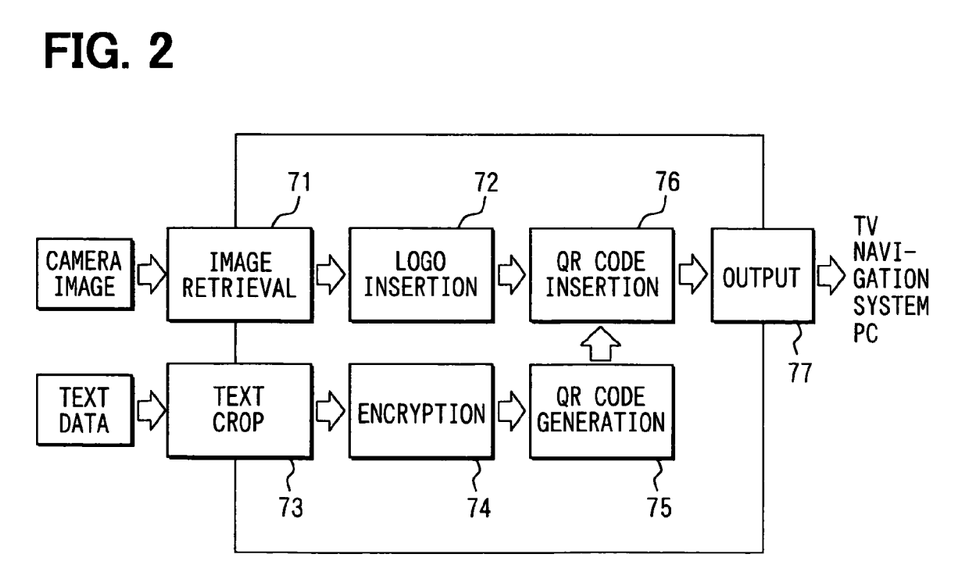
FIG. 2 shows a block diagram of processes in a CPU of the image signal output device.

FIG. 2 shows a block diagram of processes executed in a CPU of the image signal output device 1. The CPU 7 executes programs for the following processes. That is, the CPU 7 receives image signal from a camera and executes an image retrieval process 71, a logo insertion process 72, and a QR code insertion process 76 to output the image signal to devices such as a TV, a PC, or a navigation system through an output process 77. The QR code insertion process 76 receives text data being processed in a text crop process 73, an encryption process 74, and a QR code generation process 75.

The image retrieval process 71 handles the image data from the I/O interface 2 in a time series under control of the CPU 7.

The logo insertion process 72 writes a logo in each frame of the image data. The logo indicates that the image signal has a imperceptible QR code inserted therein in a time series close to or during the appearance of the logo under control of the CPU 7. The logo is superposed in the image at, for example, the lower right corner for easy perception by a user of the image signal output device 1.

The text crop process 73 retrieves text data specified by the user with the operation device 3 from the HDD 4, and divides the text data into pieces of a size that can be coded as a single QR code under control of the CPU 7.

The encryption process 74 encrypts the divided text data received from the text crop process 73 under control of the CPU 7.

The QR code generation process 75 generates the QR code from the encrypted text data processed in the encryption process 74 under control of the CPU 7.

The QR code insertion process 76 inserts the generated QR code in the QR code generation process 75 to the image data having the logo superposed in the logo insertion process 72 under control of the CPU 7. The QR code in inserted in a manner that can not be perceived by the eye of the user when it is displayed on a display device.

The output process 77 outputs the image data having the QR code inserted therein to the display device such as a TV, a PC, a navigation system or the like. The image data is sent to the display device through a radio wave for broadcasting, or through cable communications such as Internet or the like. The image data having the QR may be recorded on the HDD 4 for display.

Figure 3:
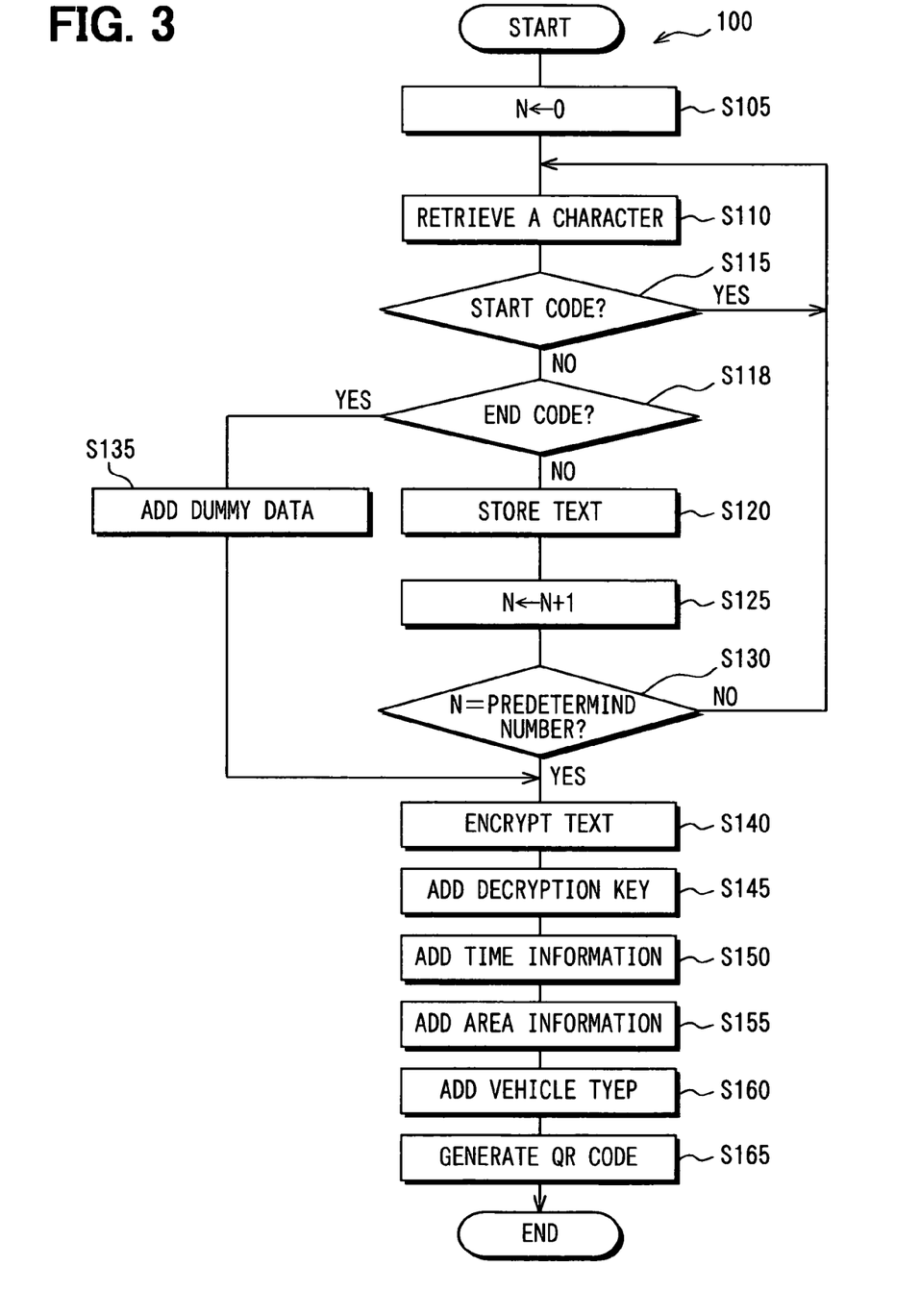
FIG. 3 shows a flowchart of a QR code generation process.

FIG. 3 shows a flowchart of a QR code generation process by a QR code output program 100. The QR code output program 100 is executed by the CPU 7 for the text crop process 73, the encryption process 74, and the QR code generation process 75. The QR code output program 100 is executed upon receiving a text data retrieval synchronization signal that is described later in the description of the embodiment.

In step S105, a value 0 (zero) is substituted for a variable N.

In step S110, one character in the text data stored in the HDD 4 is retrieved. The one character is the first character of the text data when step S110 of the process in the program 100 retrieves the text data just after an identification of a target text data by using the operation device 3. The one character is the k th character in the target text data when step S110 is iterated k times.

In step S115, the retrieved text data is compared with a predetermined special start character, i.e., a start code. The process proceeds to step S130 when the text data is the start code, and the process proceeds to step S118 when the text data is not the start code. In this case, the text data is expected to have the start code at the top of the data and is expected to have an end code at the end of the data.

In step S118, the retrieved text data is compared with a predetermined special end character, i.e., the end code. The process proceeds to step S135 when the text data is the end code, and the process proceeds to step S120 when the text data is not the end code.

In step S120, the text data retrieved in step S110 is stored in an area for retrieval data of the RAM 5.

In step S125, the value of N is incremented by 1.

In step S130, the value of N is compared with a predetermined number for counting the number of retrieved characters. The number of characters is counted so that the retrieved text data is converted to be a single QR code as a whole. More practically, the retrieved text data has to be within a certain number of characters together with additional data such as an accompanying encryption/decryption key and retrieval restriction information for being converted to a single QR code as a whole. The maximum number may be 800, 1000, 1400 or the like. The process proceeds to step S140 when the counted number reaches a predetermined maximum number. The process proceed to step S110 while the counted number is under the predetermined maximum number.

In step S135, dummy data such as data having the value of zero is added to the data retrieved in step S118 after the start of execution of the QR code output program 100. In this case, the size of the whole data, that is, the total size of the retrieved data and the dummy data, is adjusted to be the predetermined number described in step S130. Then, the process proceeds to step S140.

The CPU 7 retrieves the target text data one character at a time in order, and stores the retrieved text data except for the start code and the end code by executing step S105 through step S135. The CPU 7 ends text data retrieval when the number of the text data reaches the predetermined number, or when the end code is retrieved. The dummy data is added when the end code is retrieved.

In step S140, the retrieved and stored text data is encrypted. This step corresponds to the encryption process 74 in FIG. 2.

In step S145, a decryption key for decrypting the encrypted text data is added to the encrypted data.

In step S150, time slot information is added to the encrypted text data. The time slot information is used to restrict decryption of the encrypted text data to be within a specified time slot.

In step S155, area information is added to the encrypted text data. The area information is used to restrict decryption of the encrypted text data to be within a specified geographical area, that is, decryption is allowed when the image signal output device is located in the specified geographical area.

In step S160, vehicle type information is added the encrypted text data. The vehicle type information is used to restrict decryption of the encrypted text data only when the encrypted text data is used for the specified type of vehicle. The vehicle type information may be substituted with vehicle ID information. In this case, the encrypted text data is decrypted only when the data is used for the identified vehicle.

In step S165, a QR code is generated. That is, data processed in the preceding steps is converted to image data of the QR code in a frame. More practically, the image data of the QR code is generated from the text data that is stored in steps S105 to S135, encrypted in step S140, accompanied by the decryption key in step S145, and accompanied by retrieval restriction information in steps S150 to S160. Further, the stored data in the area for retrieval data in the RAM 5 is cleared. The process of the QR code generation program 100 concludes after step S165. Steps S145 through S165 correspond to the QR code generation process 75 in FIG. 2.

In this manner, the CPU 7 conducts the text crop process 73, the encryption process 74, and the QR code generation process 75 by executing the QR code generation program 100. The CPU 7 repeatedly executes the QR code generation program 100 for converting the whole target text data into the QR codes. That is, the target text data is divided into a predetermined number of characters to be converted to a single QR code. The retrieval of the text data returns to the top of the data when the whole text data is converted to the QR code. Therefore, the CPU 7 repeatedly converts n pieces of QR codes by executing the QR code generation program when the target text data is divided into n pieces.

Figure 4:
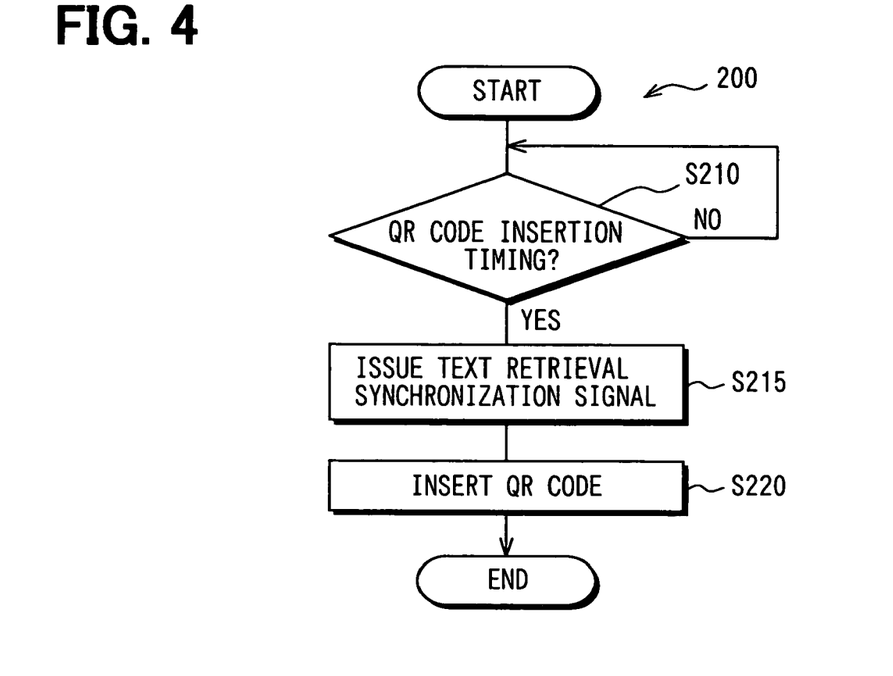
FIG. 4 shows a flowchart of a QR code insertion process.

FIG. 4 shows a flowchart of a QR code insertion process by a QR code insertion program 200. First, the QR code insertion program 200 determines if it is appropriate to insert the QR code into the image data in step S210. That is, the program 200 determines if it is an appropriate timing for inserting the QR code. The program 200 repeats the determination until it finds an appropriate insertion timing. The appropriateness of the insertion is determined based on a predetermined criteria of insertion. The appropriate insertion timing is, for example, one frame in a plurality of frames (e.g., 30 frames) in the image data. The appropriate insertion timing is not intended for the QR code to be recognized by the eye of the user of the image signal output device, but for a short period of time that can hardly be perceptible by the eye of the user. That is, the frequency of insertion of the QR code is infrequent.

In step S215, a text retrieval synchronization signal is issued when the appropriate QR code insertion timing is determined. The QR code output program 100 described above is executed upon receiving this text retrieval synchronization signal. Therefore, the QR code is generated one at every appropriate insertion timing. The CPU 7 generates the QR code while the QR code insertion program 200 is repeatedly executed.

In step S220, the QR code generated by the QR code output program 100 is inserted into the appropriate insertion timing in the image data. That is, the insertion program 200 replaces the primary image data with an image of the QR code. The inserted QR code may constitute a whole area of the image in the image data, or may be a portion of the image in the image data, i.e., a lower left corner of the image. The inserted QR code may also occupy the whole area of the image in the image data in a manner that the small QR codes spread over the whole image. One execution of the QR code insertion program 200 concludes after step S220.

In this manner, the CPU 7 conducts the QR code insertion process 76 by executing the QR code insertion program 200.

The image signal output device 1 generates the QR code from the text data, inserts the generated QR code in the primary image data, and outputs the image data having the QR code inserted therein to the display device. As a result, the image signal output device 1 outputs the image signal that includes the QR code imperceptibly inserted in the primary image.

Figure 5:
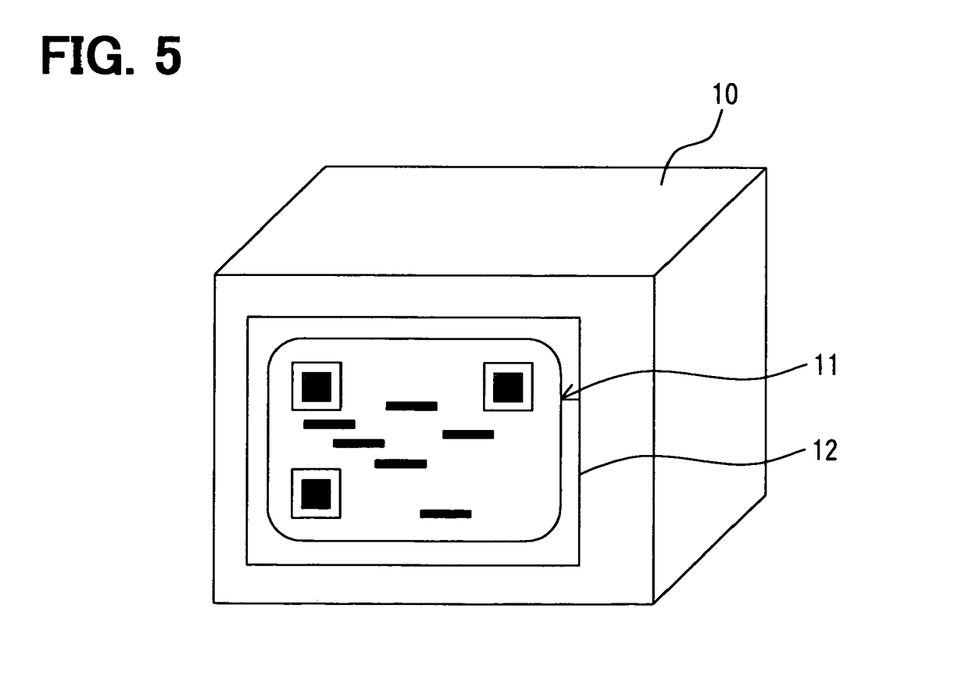
FIG. 5 shows an illustration of a QR code displayed on an image display device.

FIG. 5 shows an illustration of a QR code displayed on the display device 10. In this example, the QR code is displayed as an entire image in the periphery 11 of the display device 10. The QR code in FIG. 5 is shown for illustration purposes, and thus is actually imperceptible by the eye of the user. The QR code displayed in the periphery 11 of the display device 10, i.e., in a capture area 12, can be captured by a camera on a cell phone or the like, even when the QR code is imperceptible. The QR code displayed on the entire display device 10 can also be easily captured by the camera when the user of the camera on the cell phone or the like is at a distance from the display device 10. In addition, the capture area 12 of the display device 10 can be easily identified for capturing because of its square shape.

The QR code in the image data does not interfere with other information in the image generated from the image data because of the imperceptibility.

The QR code generated for different insertion timing can include different information. Therefore, the image data having the QR code can convey greater amount of information. The QR code at different insertion timing may include the same information. The same QR code repeatedly inserted in the image data may help increase redundancy of the information.

The image signal output device 1 inserts the logo for recognition by the eye of the user in a timely manner at or around the image data that includes the QR code. Therefore, the user can easily recognize insertion of the QR code in the image on the display device 10 even when the QR code itself is imperceptible.

The image signal output device 1 may generate the QR code from the encrypted text data. In this manner, the captured QR code can only be decrypted by the user who has an appropriate decryption key. Therefore, the information in the QR code can selectively be conveyed to a restricted group of users.

The image signal output device 1 may generate the QR code from the encrypted text data with the decryption key attached thereto. In this manner, the decryption key can easily be transferred to the user.

The image signal output device 1 may attach the restriction information on decryption and retrieval to the text data. The restriction information includes time slot information, area information, vehicle type information, vehicle ID information. In this manner, the text data in the QR code can selectively be conveyed to a restricted group of users based on the attached information.

The text data used for generating the QR code may have correspondence to the content of the primary image where the QR code is inserted. More practically, the QR coded text data may be route guidance to a tourist destination and/or lodging information of the destination when the primary image is the guidance to the tourist destination.

Figure 6:
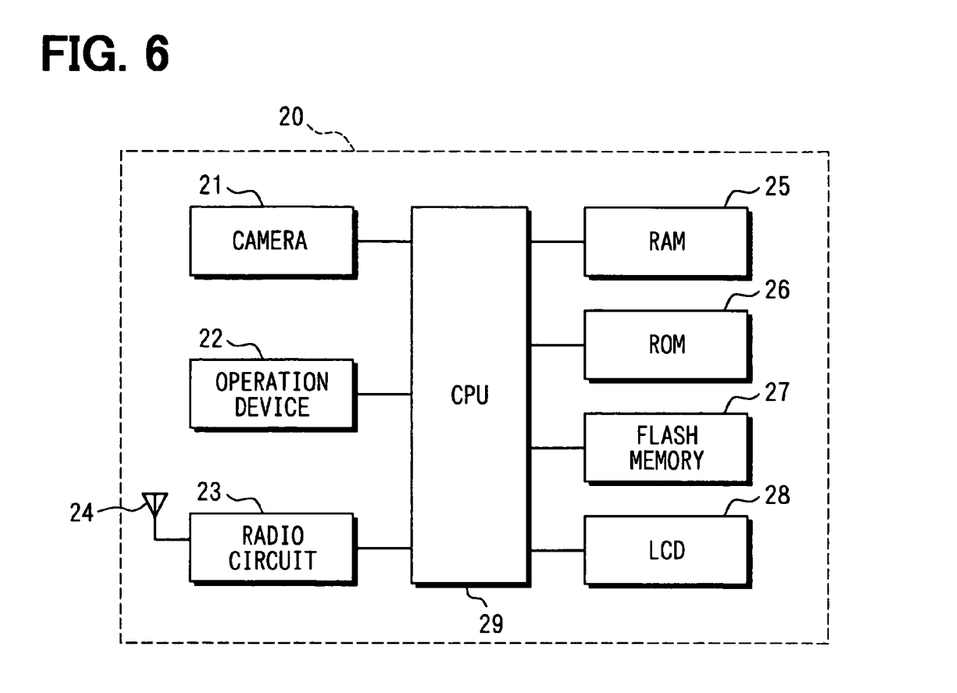
FIG. 6 shows a block diagram of a cell phone.

FIG. 6 shows a block diagram of a cell phone 20 used in the present embodiment. The cell phone 20 includes a camera 21 used to capture the QR code displayed in the image outputted by the image signal output device 1. The cell phone 20 decrypts the QR code captured by the camera 21, stores the decrypted text data in the memory and transfers the data by the e-mail. The cell phone 20 also includes an operation device 22, a radio circuit 23, an antenna 24, a RAM 25, a ROM 26, a flash memory 27, a liquid crystal display 28, a CPU 29 that serves as a computer.

The camera 21 controlled by the CPU 29 outputs the captured frame of images to the CPU 29. The timing of capturing the image can be controlled in an order of millisecond.

The operation device 22 is used to output a signal to the CPU 29 based on the input operation for placing a phone call, sending an e-mail and capturing an image by the camera through number buttons and function buttons.

The radio circuit 23 is used to transmit and receive a radio signal for placement of a phone call, transmission of an e-mail or the like. The radio circuit 23 controls an output of the radio wave from the antenna 24 based on the signal received from the CPU 29 after D/A conversion, amplification, frequency conversion, modulation and the like. The radio circuit 23 also controls an output of the data derived from the radio wave received by the antenna 24 and outputted to the CPU 29 after amplification, frequency conversion, demodulation, A/D conversion and the like.

The liquid crystal display 28 displays the image based on the received data from the CPU 29 for the user of the image signal output device 1.

The CPU 29 retrieves and executes a program from the ROM 26 and/or the flash memory 27 that is non volatile memory medium for read and write. The CPU 29 controls the following processes. That is, the CPU 29 controls the camera 21, receives the captured image from the camera 21, receives the operation signal from the operation device 22, outputs the data for placement of the call, transfer of the e-mail, or the like, receives the data from the radio circuit 23, writes the data in the RAM 25 and the flash memory 27, and outputs the image data to the liquid crystal display 28 for image display.

More practically, the CPU 29 outputs, for example, speech data from a microphone (not shown in the figure) to the radio circuit 23 while the user is placing a call, and output a voice from other cell phone to a speaker (not shown in the figure) based on voice data received by the radio circuit 23.

Figure 7:
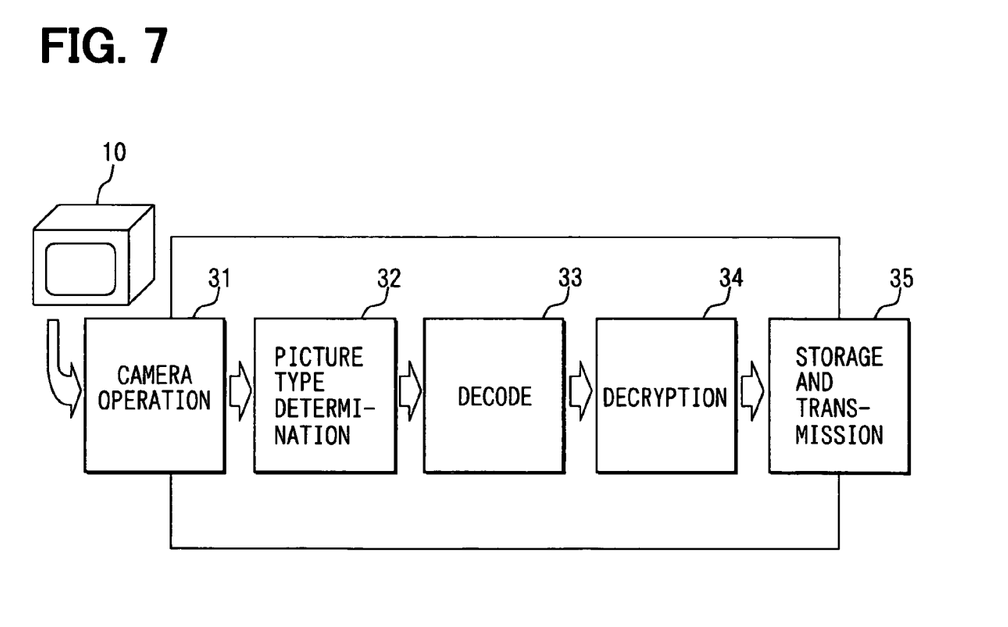
FIG. 7 shows a block diagram of processes in the cell phone.

FIG. 7 shows a block diagram of QR code capture processes in the cell phone 20 controlled by the CPU 29. The processes for QR code capture includes a camera operation process 31, a picture type determination process 32, a decode process 33, a decryption process 34, and a storage and transmission process 35.

In the camera operation process 31, the CPU 29 operates the camera for capturing the QR code in the image displayed on the display device 10 and acquires the image data from the camera in frames.

In the picture type determination process 32, the CPU 29 determines if the acquired QR code image data is a moving picture type QR code or a still picture type QR code. In this case, the moving picture type QR code is defined as QR code images that include different QR codes in a series of QR code images displayed on the display device 10 (the QR codes in the series may partly include the same QR code). The still picture type QR code is defined as a QR code images that are constituted from the same QR codes displayed on the display device 10.

In the decode process 33, the CPU 29 decodes the QR code based on the type of the QR code determined in the picture type determination process 32.

In the decryption process 34, the CPU 29 decrypts the QR code decoded in the decode process 33.

In the storage and transmission process 35, the CPU 29 stores the decrypted text data in the RAM 25 or the flash memory 27, and outputs the decrypted text data to the radio circuit 23 for sending as the e-mail.

Figure 8:
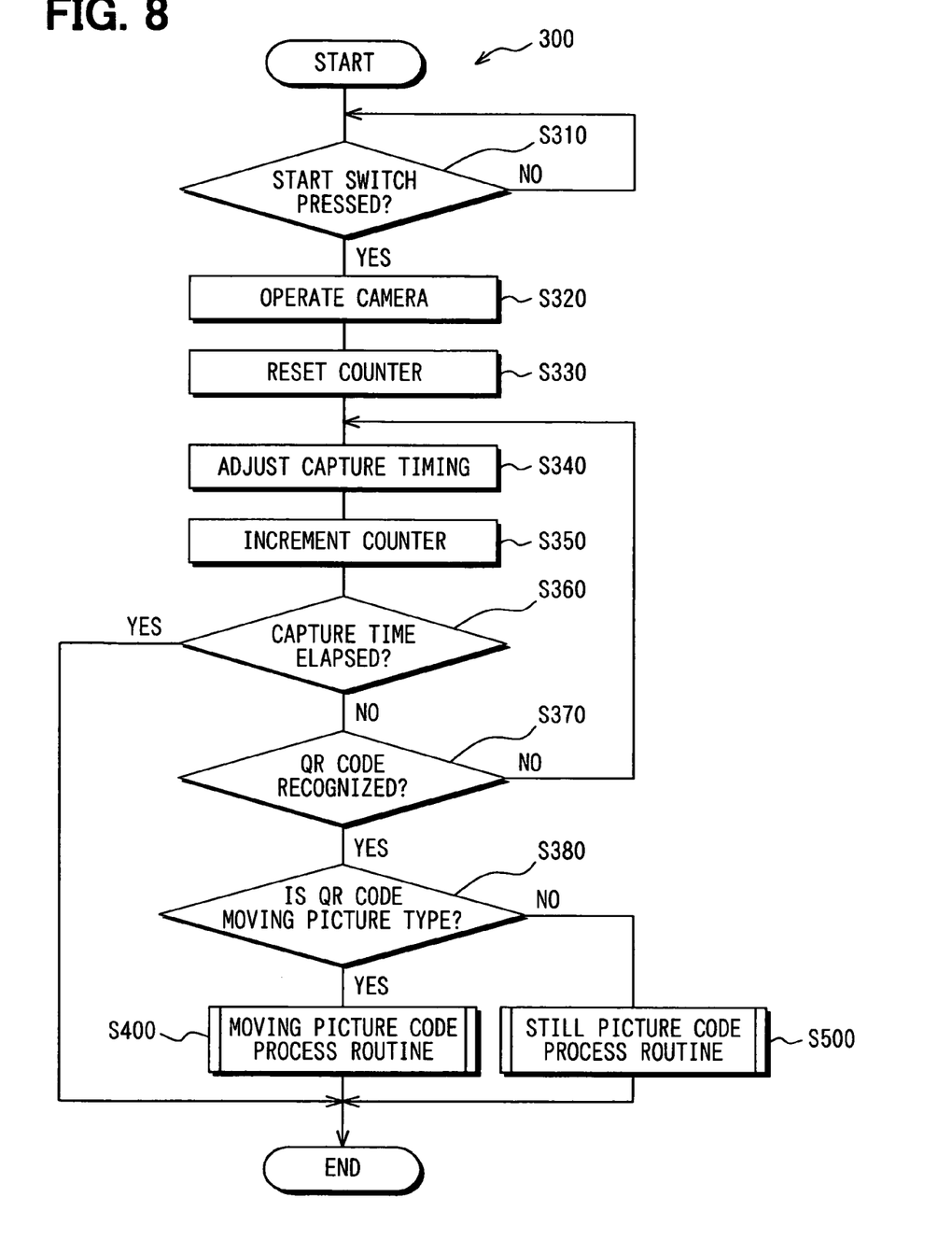
FIG. 8 shows a flowchart of a QR code capture and decode process.

FIG. 8 shows a flowchart of a QR code capture and decode process by a QR code retrieval and decode program 300. The QR code retrieval and decode program 300 may be downloaded to the cell phone 20 by the radio circuit 23 or the like through a wireless and/or wired network. The QR code retrieval and decode program 300 may be downloaded to the liquid crystal display 28 based on cell phone type information transferred to a server that stores the program 300. In this case, the CPU 29 repeatedly executes the program 300.

In step S310, the process of the program 300 determines if a start switch in the operation device 22 is pressed for starting capture of the QR codes.

In step S320, the camera 21 is operated for capturing the QR codes when the process determines the start switch in the operation device 22 is pressed.

Then, capture timing by the camera 21 is synchronized with the QR code display timing on the display device 10.

In step S330, resetting a counter is executed, that is, a count variable in the RAM 25 is set to zero.

In step S340, capture timing is adjusted, that is, the camera 21 is controlled for an adjustment (increase or decrease) of a repetition interval of capture, and for a shift of capture timing or the like.

In step S350, counting up is executed, that is, the count variable is incremented.

In step S360, capture time is measured by comparing the value of the count variable with a predetermined threshold. The QR code retrieval and decode program 300 is concluded when the threshold is exceeded. An error message may be displayed on the liquid crystal display 28. The process proceeds to step 370 when the threshold is not exceeded.

In step S370, recognition of the QR code is determined. That is, the process determines whether the captured image by the camera 21 is a QR code or not. The process proceeds to step 380 when the captured image is a QR code, that is, the capture timing is appropriate. The process returns to step S340 when the capture timing by the camera 21 is not appropriate for QR code recognition.

The camera 21 continues capture of the QR codes until QR code capture timing is synchronized with the QR code display timing, or until capture time is exceeded. Steps 330 to 370 correspond to the camera operation process 31. In this case, the ROM 26 and/or the flash memory 27 may store prepared information on the QR code display timing. The prepared information on the QR code display timing is used for a fine adjustment for synchronization of the capture interval with the display interval of the QR code beside shifting the capture timing.

In step S380, the QR codes captured by the camera 21 are compared with each other so that the process can determine whether each of the QR codes are the same or not. That is, the process determines whether the captured QR code is the moving picture type QR code or the still picture type QR code. The process proceeds to step S400 when the QR code is the moving picture type, or the process proceeds to step S500 when the QR code is the still picture type. Step S380 corresponds to the picture type determination process 32.

Figure 9:
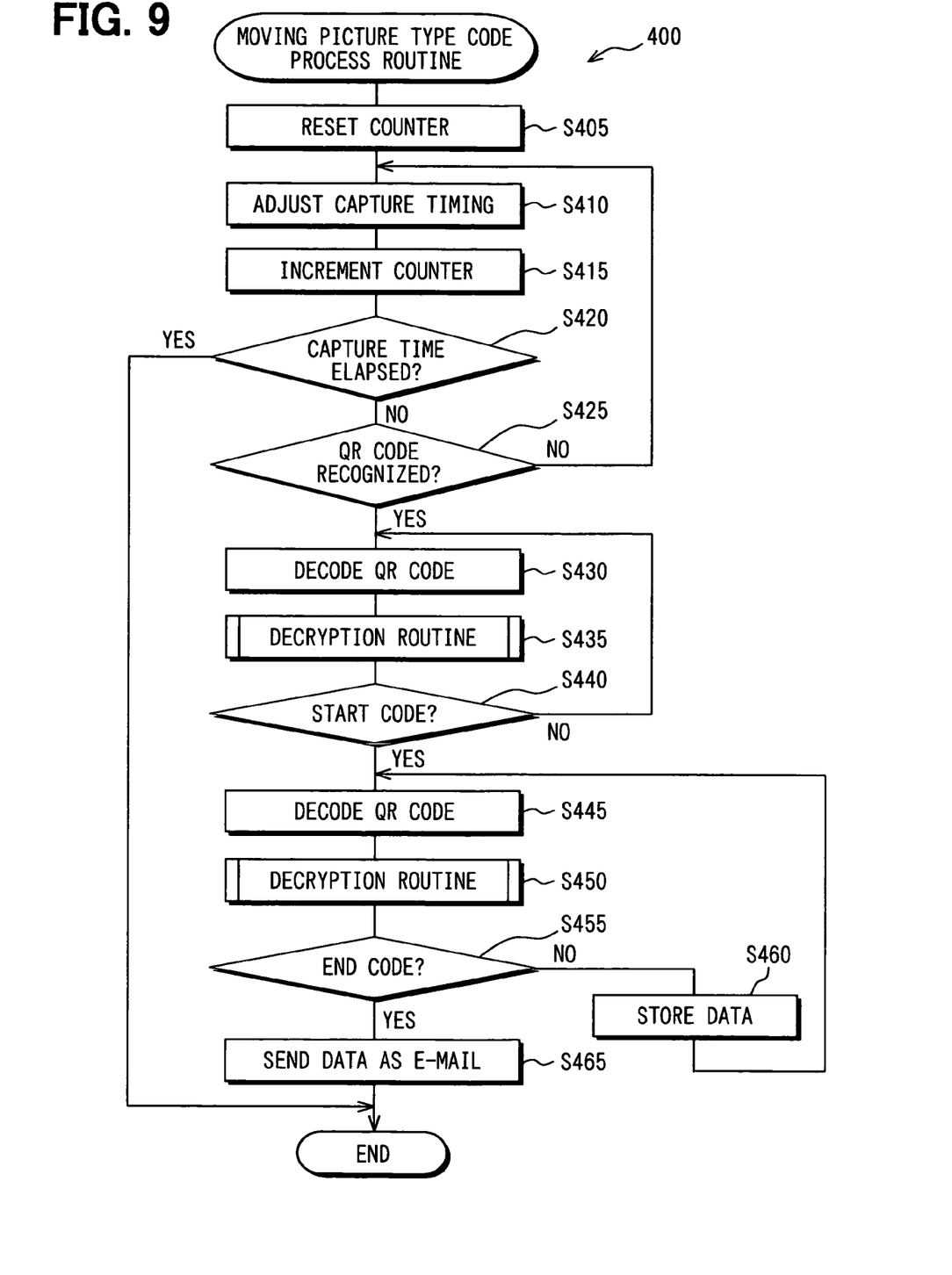
FIG. 9 shows a flowchart of a moving picture type QR code handling process.

FIG. 9 shows a flowchart of a moving picture type QR code handling process by a moving picture code process routine 400. The CPU 29 controls the process of the routine 400.

In step S405, the process resets the counter. In step S410, the process adjusts the capture timing. In step S415, the process increments the counter. In step S420, the process determines if the capture time is within a predetermined range. In step S425, the process recognizes the QR code. Steps S405 to S425 are substantially the same as steps S330 to S370 in the QR code retrieval and decode program 300. However, the adjustment of the capture timing in step S410 is finer than that in step S340 because the capture timing is roughly adjusted in steps S330 to S370.

The process proceeds to step S430 when the camera 21 captures the QR code as a result of the capture timing adjustment. The process of the QR code retrieval and decode program 300 concludes when the capture time exceeds the predetermined range. An error message may be displayed on the liquid crystal display 28 before concluding the program 300. The camera operation process 31 by steps S405 to S425 is conducted in this manner.

In step S430, one of the QR codes repeatedly captured in a series by the camera 21 is decoded. In step S435, the decoded data is decrypted. Details of the decryption is described later.

In step S440, the process determines whether the decrypted data is the start code or not. The process proceeds to step S445 when the decrypted data is the start code. The process returns to step S430 when the decrypted data is not the start code.

In step S445, a subsequent QR code in a series is decoded. In step S450, the decoded data is decrypted. Details of the decryption is described later.

In step S455, the process determines whether the decrypted data is the end code or not. The process proceeds to step S465 when the decrypted data is the end code. The process proceeds to step S460 when the decrypted data is not the end code.

In step S460, the decoded and decrypted data is stored in a designated area for the decoded and decrypted data in the RAM 25. The process returns to step S445 after step S460.

In step S465, the data stored in the designated area in the RAM 25 is sent as an e-mail from the radio circuit 23. The address of the e-mail may be assigned to a device that is in need of the information contained in the data. For example, the data may be sent to the e-mail address assigned to a navigation system used by the user of the cell phone 20 when the data contains the information on the location of a facility or the like. The data stored in the RAM 25 is discarded after being sent as the e-mail. The process of the QR code retrieval and decode program 300 is concluded after step S465.

In this manner, the CPU 29 decodes and decrypts the QR codes captured in a series until it finds the start code (steps S430 to S440), and the CPU 29 accumulatively stores the decoded and decrypted data in the QR codes in a storage after it finds the start code (steps S455 to S460). The CPU 29 sends the accumulated data as the e-mail when it finds the end code (step S465). That is, the CPU 29 stores and sends the data between the start code and the end code as a series of data. In this case, step S445 corresponds to the decode process 33, and steps S460 and S465 correspond to the storage and transmission process 35.

Figure 10:
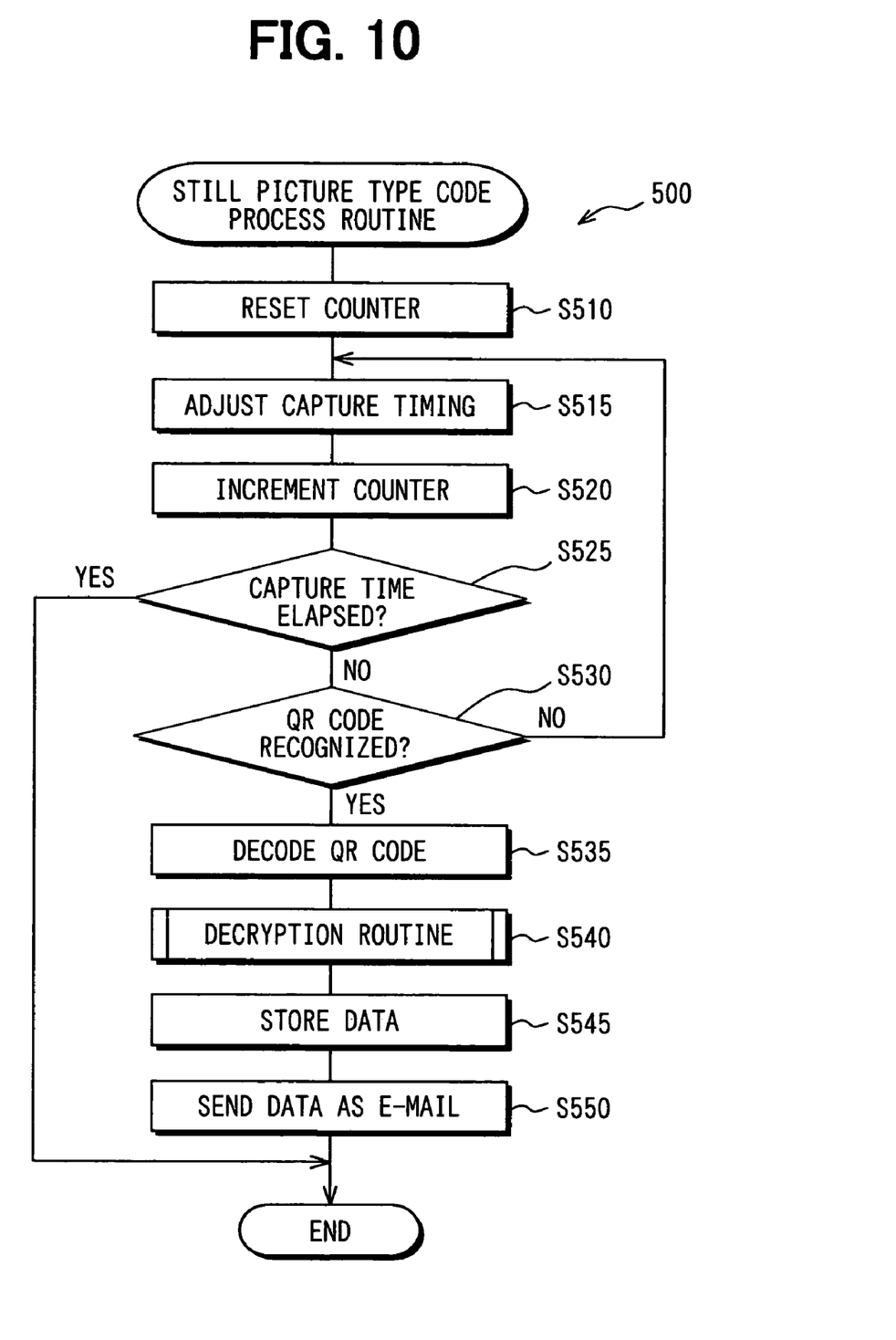
FIG. 10 shows a flowchart of a still picture type QR code handling process.

FIG. 10 shows a flowchart of a still picture type QR code handling process by a still picture code process routine 500. The CPU 29 controls the process of the routine 500.

In step S510, the process resets the counter. In step S515, the process adjusts the capture timing. In step S520, the process increments the counter. In step S525, the process determines if the capture time is within a predetermined range. In step S530, the process recognizes the QR code. Steps S510 to S530 are substantially the same as steps S330 to S370 in the QR code retrieval and decode program 300. However, the adjustment of the capture timing in step S515 is finer than that in step S340 because the capture timing is roughly adjusted in steps S330 to S370.

The process proceeds to step S535 when the camera 21 captures the QR code as a result of the capture timing adjustment. The process of the QR code retrieval and decode program 300 concludes when the capture time exceeds the predetermined range. An error message may be displayed on the liquid crystal display 28 before concluding the program 300. The camera operation process 31 by steps S510 to S530 is conducted in this manner.

In step S535, one or more frames of the QR codes repeatedly captured by the camera 21 is decoded. In this case, plural frames of the QR codes are averaged for noise removal.

In step S540, the decoded data is decrypted. Details of the decryption is described later.

In step S545, the decoded and decrypted data in steps S535 and S540 is stored in a designated area for the decoded and decrypted data in the RAM 25.

In step S550, the data stored in the designated area in the RAM 25 is sent as an e-mail from the radio circuit 23. The address of the e-mail is specified in the same manner as in step S465 of the moving picture code process routine 400. The data stored in the RAM 25 is discarded after being sent as the e-mail. The process of the QR code retrieval and decode program 300 is concluded after step S550.

In this manner, the CPU 29 decodes and decrypts the QR codes (steps S535 to S540), and the CPU 29 stores the decoded and decrypted data in the QR codes in a storage (step S545). The CPU 29 sends the accumulated data as the e-mail (step S550). In this case, step S535 corresponds to the decode process 33, and steps S545 and S550 correspond to the storage and transmission process 35.

Figure 11:
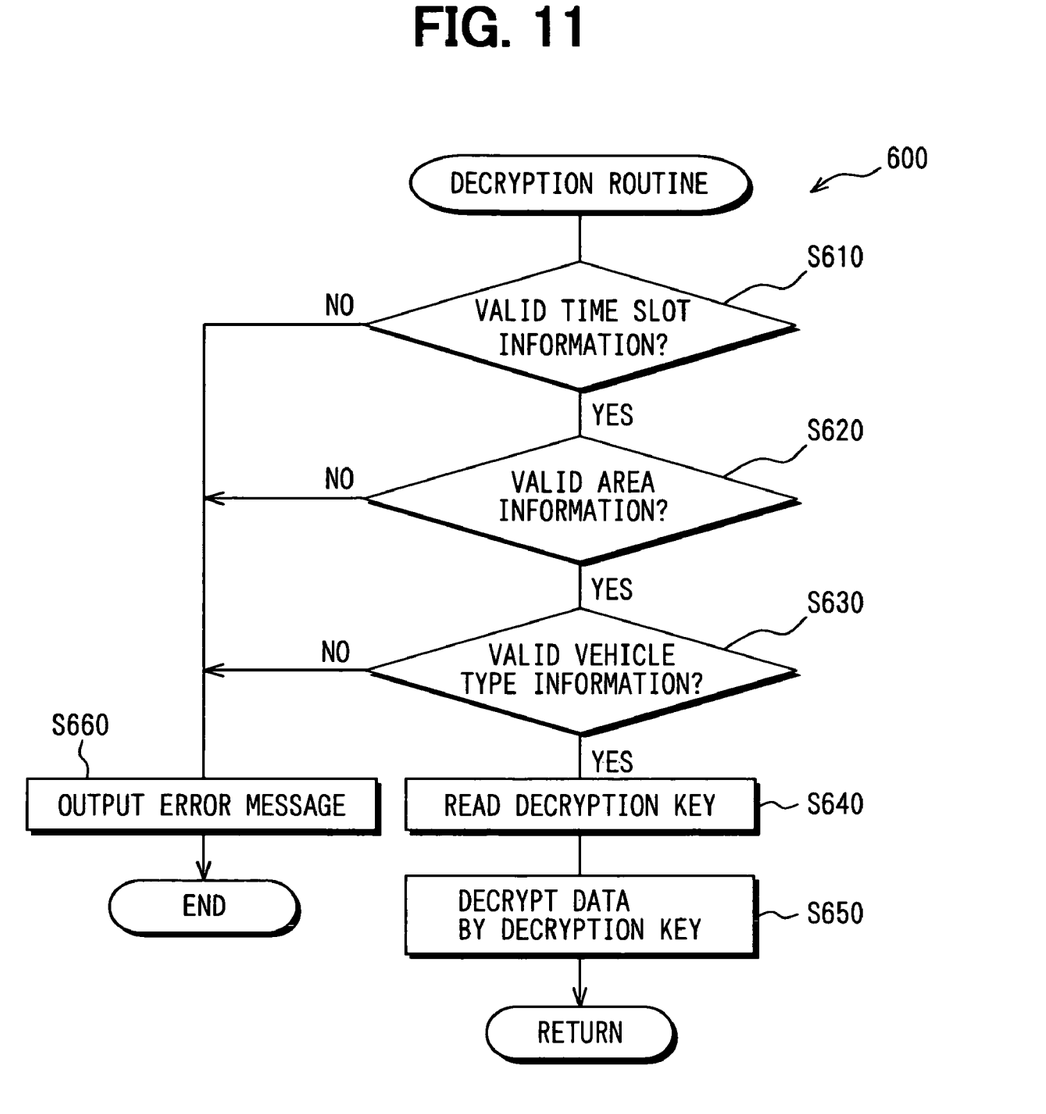
FIG. 11 shows a flowchart of a decode process.

Next, a decryption process executed as steps S435, S450 in the moving picture code process routine 400 and step S540 in the still picture code process routine 500 is described. FIG. 11 shows a flowchart of a decryption routine 600 executed by the CPU 29. The CPU 29 controls the process of the routine 600.

In step S610, the process determines whether the time slot information is valid. More practically, the process determines whether a current time coincides with a range of time specified in the time slot information in the decoded QR code data. The process proceeds to step S620 when the time slot information is valid. The process proceeds to step S660 when the time slot information is not valid.

In step S620, the process determines whether the area information is valid. More practically, the process determines whether a current position exists within an area specified in the area information in the decoded QR code data. The current position of the cell phone 20 may be inputted by the user, or may be retrieved from a GPS (Global Positioning System) receiver (not shown in the figure) installed in the cell phone 20. The process proceeds to step S630 when the area information is valid. The process proceeds to step S660 when the area information is not valid.

In step S630, the process determines whether the vehicle type information is valid. More practically, the process determines whether an identified type of a vehicle owned by the user of the cell phone 20 matches with the type of vehicle specified in the vehicle type information in the decoded QR code data. The identified type of the vehicle may be inputted by the user from the operation device 3, or may be retrieved from the navigation system on the vehicle through communication by the cell phone 20. The process proceeds to step S640 when the vehicle type information is valid. The process proceeds to step S660 when the vehicle type information is not valid.

In step S630, the process may determine whether the vehicle ID information instead of the vehicle type information is valid. More practically, the process may determine whether an identified vehicle ID of the vehicle owned by the user of the cell phone 20 matches with one of the vehicle IDs specified in the vehicle ID information in the decode QR code data. The identified ID of the vehicle may be inputted by the user from the operation device 3, or may be retrieved from the navigation system on the vehicle through communication by the cell phone 20.

In step S640, the process reads the decryption key from the decoded QR code data.

In step S650, the process decrypts the encrypted text data in the decoded QR code data. In this manner, the text data is retrieved. The process of the decryption routine 600 concludes after step S650. Therefore, the process of the QR code retrieval and decode program 300 proceeds to a subsequent step of a decryption routine 600 calling step.

In step S660, an error message that indicates that the decryption and retrieval of the text data is not executed because decryption and retrieval condition was not met is displayed on the liquid crystal display 28. The QR code retrieval and decode program 300 concludes after step S660.

The CPU 29 retrieves the text data in the QR code by decrypting the encrypted data with the decryption key (steps S640, S650) when the captured QR code has the matching time slot/area/vehicle type (vehicle ID) information with the information stored in the cell phone 20 (steps S610 to S630). The CPU 29 outputs the error message when at least one of the time slot/area/vehicle type (vehicle ID) information does not match with the information stored in the cell phone 20 (step S660). The CPU 29 conducts the decryption process 34 in this manner.

The CPU 29 in the cell phone 20 can capture the QR code imperceptibly displayed on the display device 10 by the camera 21, store the decoded/decrypted data and transmit the decoded/decrypted data by the above-described series of processes. In this manner, the cell phone 20 can capture, decode, decrypt and store the QR code inserted in the images on the display device 10 in the image signal output device 1.

Although the present invention has been fully described in connection with the preferred embodiment thereof with reference to the accompanying drawings, it is to be noted that various changes and modifications will become apparent to those skilled in the art.

For example, the image signal output device 1 may insert a stack type two dimensional code, a matrix type two dimensional code or other type of two dimensional code instead of the QR code. The image signal output device 1 may also insert a one dimensional code in the image data. The cell phone 20 captures the inserted geometrical code for decoding and decryption.

Further, the insertion of the QR code in the image may take a form of watermark instead of frame insertion. That is, all frames of the image may have the QR code imperceptibly "watermarked" over the primary image. In this manner, the image signal output device 1 inserts or "watermarks" the image displayed on the display device 10.

Furthermore, the QR code may be generated from a program data, or an image data instead of the text data. Source of the QR code may be any type of data.

Furthermore, the camera 21 may be a movie camera for continuously recording a moving picture. In this case, the CPU 29 extract the geometrical pattern of codes (matrix code) from the recorded picture data.

Furthermore, the image signal output device 1 may encrypt an entire data for QR coding instead of fittingly dividing the entire data for the single QR code. That is, the entire data for QR coding may be encrypted in the first place as a whole, and the encrypted entire data may be divided into pieces, each of the pieces fittingly coded as a single QR code. In this case, only one decryption key is required for decrypting the entire data. Therefore, the decryption is attached to, for example, the first piece or the last piece of divided data. Consequently, the cell phone 20, the receiving side of the data, may decrypt the received data by using the only one decryption key after integrating the entire data for decryption.

Furthermore, the CPU 7 in the image signal output device 1 may execute the QR code output program 100 only once before executing the QR code insertion program 200 for generating the required QR codes at one time instead of executing the program 100 every time it receives the text data retrieval synchronization signal from the program 200.

Furthermore, the CPU 29 in the cell phone 20 may find the start code and the end code as the QR code instead of finding them in the decoded and decrypted QR code data in steps S440 and S455 of the moving picture code process routine 400. In this case, the start code and the end code may be inserted as the start QR code and the end QR code.

Furthermore, the image signal output device 1 used as a display of a car navigation system or a display of a personal computer may output diagnosis data of the car navigation system or the personal computer. That is, the diagnosis data or operation data conveyed as the QR code does not interfere with the primary image displayed on the output device 1. The diagnosis data that reflects operation condition/trouble condition can be used for maintenance of the image signal output device 1 by capturing the QR code for decoding and decryption.

Furthermore, the image signal output device 1 may conduct the image retrieval process 71, the logo insertion process 72, the text crop process 73, the encryption process 74, the QR code generation process 75, and the QR code insertion process 76 in FIG. 2 by using designated hardware (e.g., a programmable FPGA) for each of the above-described processes instead of conducting these processes in the general purpose CPU 7.

Furthermore, the cell phone 20 may conduct the camera operation process 31, the picture type determination process 32, the decode process 33, the decryption process 34 and the storage and transmission process 35 in FIG. 7 by using designated hardware (e.g., a programmable FPGA) for each of the above-described processes instead of conducting these processes in the general purpose CPU 29.

Furthermore, the image signal output device 1 may generate the QR code based on text broadcasting in an image of a television. In this case, the image signal output device 1 may be used in the following manners. The image signal output device 1 may be used to generate the matrix code (the QR code) according to the description of the QR code output program 100 based on the text data for the text broadcasting when the device 1 is used in a broadcasting station. The image signal output device 1 may be used to generate the matrix code (the QR code) according to the description of the QR code output program 100 based on the received text data of the text broadcasting when the device 1 is used as a television receiver on a receiving side of the text broadcasting. The output of the matrix code (the QR code) according to the description of the QR code output program 100 based on the text data for the text broadcasting may selectively be specified by the user by using the operation device 3 when the device I is used as the television receiver.

Such changes and modifications are to be understood as being within the scope of the present invention as defined by the appended claims.

What is claimed is:

1. An image signal output device comprising:
a code generating means for generating a two-dimensional geometrical code based on a source data;
an obtaining means for obtaining a sequential image signal;
a code inserting means for inserting the two-dimensional geometrical code in the sequential image signal;
an insertion timing detection means for detecting a two-dimensional geometrical code insertion timing in the sequential image signal; and
an output means for outputting the sequential image signal, wherein
the code inserting means imperceptibly inserts the two-dimensional geometrical code as a momentary image in the sequential image signal,
the output means outputs the sequential image signal having the two-dimensional geometrical code inserted therein, and
the two-dimensional geometrical code is inserted at the two-dimensional geometrical code insertion timing in the sequential image signal.

2. The image signal output device according to claim 1, wherein the two-dimensional geometrical code inserted in the sequential image signal occupies an entire area of an image generated from the sequential image signal on a display device.

3. The image signal output device according to claim 1, wherein the sequential image signal renews the image on a display device at a predetermined interval, and
the two-dimensional geometrical code inserted in the sequential image signal appears at an interval that is made up of a plurality of the predetermined intervals.

4. The image signal output device according to claim 1 further comprising a marking means for superposing a code insertion mark on an image generated from the sequential image signal,
wherein the image having the two-dimensional geometrical code inserted therein has the code insertion mark in a visible manner.

5. The image signal output device according to claim 4, wherein the code insertion mark appears concurrently with the image that has the two-dimensional geometrical code inserted therein.

6. The image signal output device according to claim 4, wherein the code insertion mark appears time-shiftingly in synchronization with the image that has the two-dimensional geometrical code inserted therein by a predetermined amount of time.

7. The image signal output device according to claim 1, wherein the source data includes a diagnosis data.

8. The image signal output device according to claim 7, wherein the source data has relevance to a visual content of the sequential image signal.

9. The image signal output device according to claim 1, wherein the code generating means generates the two-dimensional geometrical code based on text broadcasting data in a television image signal.

10. An image signal output device comprising:
a code generating means for generating a two-dimensional geometrical code based on a source data;
an obtaining means for obtaining a sequential image signal;
a code inserting means for inserting the two-dimensional geometrical code in the sequential image signal; and
an output means for outputting the sequential image signal, wherein
the code inserting means imperceptibly inserts the two-dimensional geometrical code as a momentary image in the sequential image signal,
the output means outputs the sequential image signal having the two-dimensional geometrical code inserted therein, and
the sequential image signal has a plurality of the two-dimensional geometrical code insertion timings dispersed across the sequential image signal.

11. The image signal output device according to claim 10, wherein the plurality of the two-dimensional geometrical code insertion timings have respectively different two-dimensional geometrical codes inserted therein.

12. The image signal output device according to claim 10, wherein the plurality of the two-dimensional geometrical code insertion timings have same two-dimensional geometrical codes inserted therein.

13. An image signal output device comprising:
a code generating means for generating a two-dimensional geometrical code based on a source data;
an obtaining means for obtaining a sequential image signal;
a code inserting means for inserting the two-dimensional geometrical code in the sequential image signal; and
an output means for outputting the sequential image signal, wherein
the code inserting means imperceptibly inserts the two-dimensional geometrical code as a momentary image in the sequential image signal,
the output means outputs the sequential image signal having the two-dimensional geometrical code inserted therein, and
the code generating means generates the two-dimensional geometrical code based on an encrypted source data.

14. The image signal output device according to claim 13, wherein the code generating means generates the two-dimensional geometrical code based on an encrypted source data accompanied by a decryption key for decrypting the encrypted source data.

15. An image signal output device comprising:
a code generating means for generating a two-dimensional geometrical code based on a source data;
an obtaining means for obtaining a sequential image signal;
a code inserting means for inserting the two-dimensional geometrical code in the sequential image signal; and
an output means for outputting the sequential image signal, wherein
the code inserting means imperceptibly inserts the two-dimensional geometrical code as a momentary image in the sequential image signal,
the output means outputs the sequential image signal having the two-dimensional geometrical code inserted therein, and
the code generating means generates the two-dimensional geometrical code based on a source data that includes information regarding retrieval restriction.

16. The image signal output device according to claim 15, wherein the code generating means generates the two-dimensional geometrical code based on a source data that includes time slot information regarding retrieval restriction.

17. The image signal output device according to claim 16, wherein the code generating means generates the two-dimensional geometrical code based on a source data that includes area information regarding retrieval restriction.

18. The image signal output device according to claim 17, wherein the code generating means generates the two-dimensional geometrical code based on a source data that includes vehicle type information regarding retrieval restriction.

19. The image signal output device according to claim 18, wherein the code generating means generates the two-dimensional geometrical code based on a source data that includes vehicle ID information regarding retrieval restriction.

20. A method of generating a two-dimensional geometrical coded image signal based on a source data comprising:
generating a two-dimensional geometrical code based on the source data;
retrieving an image signal for a plurality of images in a time series;
detecting a two-dimensional geometrical code insertion timing in the image signal;
imperceptibly inserting the two-dimensional geometrical code as a momentary image at the two-dimensional geometrical code insertion timing in the image signal; and
outputting, from an image signal output device, the image signal having the two-dimensional geometrical code inserted therein.

* * * * *